(12) United States Patent
Hensel et al.

(10) Patent No.: US 7,659,693 B2
(45) Date of Patent: Feb. 9, 2010

(54) RECHARGEABLE BATTERY

(75) Inventors: Maic Hensel, Backnang (DE); Juergen Weiss, Winnenden (DE); Ralph Diehl, Baltmannsweiler (DE); Martin Schmidgall, Aspach (DE); Holger Lepold, Nellmersbach (DE)

(73) Assignee: Alfred Kaercher GmbH & Co. KG, Winnenden (DE)

( * ) Notice: Subject to any disclaimer, the term of this patent is extended or adjusted under 35 U.S.C. 154(b) by 0 days.

(21) Appl. No.: 12/075,104

(22) Filed: Mar. 7, 2008

(65) Prior Publication Data
US 2008/0224657 A1 Sep. 18, 2008

Related U.S. Application Data

(63) Continuation of application No. PCT/EP2006/007040, filed on Jul. 18, 2006.

(30) Foreign Application Priority Data

Sep. 13, 2005 (DE) .................. 10 2005 045 656

(51) Int. Cl.
*H02J 7/00* (2006.01)
(52) U.S. Cl. .................. 320/112; 320/114; 362/157
(58) Field of Classification Search ............. 320/106, 320/107, 110, 112, 113, 114, 115, 111; 429/97, 429/99, 100; 439/500; 30/DIG. 1
See application file for complete search history.

(56) References Cited

U.S. PATENT DOCUMENTS

| | | | |
|---|---|---|---|
| 4,431,245 A | | 2/1984 | Jigamian et al. |
| 4,835,452 A | * | 5/1989 | Kuriyama .................. 320/114 |
| 5,014,386 A | | 5/1991 | Worwag |
| 5,222,670 A | | 6/1993 | Huang |
| 6,018,227 A | * | 1/2000 | Kumar et al. .............. 320/106 |
| 6,057,608 A | | 5/2000 | Bailey, Jr. et al. |
| 6,223,835 B1 | | 5/2001 | Habedank et al. |
| 6,329,788 B1 | | 12/2001 | Bailey, Jr. et al. |
| 6,525,511 B2 | | 2/2003 | Kubale et al. |
| 2002/0089306 A1 | | 7/2002 | Kubale et al. |
| 2003/0090234 A1 | | 5/2003 | Glasgow et al. |

(Continued)

FOREIGN PATENT DOCUMENTS

DE     93 19 361     3/1994

(Continued)

*Primary Examiner*—Edward Tso
*Assistant Examiner*—M'Baye Diao
(74) *Attorney, Agent, or Firm*—Lipsitz & McAllister, LLC

(57) ABSTRACT

The invention relates to a rechargeable battery with a battery housing having a rear wall with a recess which extends as far as an end wall of the battery housing and has a base side and narrow sides facing each other, the base side continuing via a step into the outer side of the rear wall, and a contact assembly which is covered by a cover extending from the step being positioned at the step. In order to further develop the battery so that when the battery is connected to an electrical appliance the contact assembly is protected against splash water, it is proposed, in accordance with the invention, that the cover form a contact housing which completely surrounds the contact assembly in circumferential direction and has on its side facing away from the step an insertion opening surrounded by a circumferential rim of the contact housing, which forms a sealing surface.

8 Claims, 2 Drawing Sheets

U.S. PATENT DOCUMENTS

| | | |
|---|---|---|
| 2004/0070367 A1 | 4/2004 | Schadoffsky et al. |
| 2004/0081882 A1 | 4/2004 | Ontl |
| 2004/0088817 A1 | 5/2004 | Cochran et al. |
| 2005/0055795 A1 | 3/2005 | Zeiler et al. |
| 2005/0273969 A1 | 12/2005 | Watson et al. |
| 2006/0274520 A1* | 12/2006 | Dalton et al. ............... 362/157 |
| 2007/0113369 A1 | 5/2007 | Cochran et al. |

FOREIGN PATENT DOCUMENTS

| | | |
|---|---|---|
| DE | 100 56 370 | 7/2001 |
| DE | 100 40 893 | 8/2001 |
| DE | 102 29 980 | 1/2004 |
| DE | 102 33 162 | 2/2004 |
| DE | 10 2004 036 209 | 3/2005 |
| EP | 0 378 120 | 7/1990 |
| EP | 1 025 962 | 8/2000 |
| EP | 1 076 370 | 2/2001 |
| EP | 1 315 266 | 5/2003 |
| JP | 2003 235771 | 8/2003 |

\* cited by examiner

RECHARGEABLE BATTERY

This application is a continuation of international application number PCT/EP2006/007040 filed on Jul. 18, 2006.

The present disclosure relates to the subject matter disclosed in international application number PCT/EP2006/007040 of Jul. 18, 2006 and German application number 10 2005 045 656.1 of Sep. 13, 2005, which are incorporated herein by reference in their entirety and for all purposes.

BACKGROUND OF THE INVENTION

The invention relates to a rechargeable battery with a battery housing having a rear wall with a recess which extends as far as an end wall of the battery housing and has a base side and narrow sides facing each other, the base side continuing via a step into the outer side of the rear wall, and a contact assembly which is covered by a cover extending from the step being positioned at the step.

Such rechargeable batteries are used in cordless electrical appliances, in particular, in power tools, for example, in battery-operated vacuum cleaners. The batteries are releasably connectable to the electrical appliance and can be separated from the electrical appliance for charging and charged by a charger. The batteries have a multiplicity of cells arranged in the battery housing, and a contact assembly is used to establish an electrical connection between the battery and the electrical appliance or the charger.

A battery is known from published application DE 102 29 980 A1, wherein the contact assembly is in the form of contact elements arranged openly at the rear wall. The contact elements are easily contactable from the outside, but they are not protected against mechanical or other action thereon.

A battery of the kind mentioned at the outset is known from published application DE 10 2004 036 209 A1. To protect the contact assembly against mechanical impairment a cover is used, which covers the contact assembly and is arranged together with the contact assembly in a recess of the rear wall. As a result, the contact assembly can be protected to a considerable extent against mechanical impairment, but the danger does exist that during operation of the electrical appliance the contact assembly will come into contact with splash water that may occur. This can cause an electrical failure.

The object of the present invention is to further develop a rechargeable battery of the kind mentioned at the outset so that when connecting the battery to an electrical appliance the contact assembly can be protected in a constructionally simple manner against splash water.

SUMMARY OF THE INVENTION

This object is accomplished in a rechargeable battery of the generic kind, in accordance with the invention, in that the cover forms a contact housing which completely surrounds the contact assembly in circumferential direction and has on its side facing away from the step an insertion opening surrounded by a circumferential rim of the contact housing, which forms a sealing surface.

By providing a circumferential rim which completely surrounds the insertion opening of the contact housing in circumferential direction, the contact assembly can be protected in a simple manner against splash water by means of a sealing ring when connecting the battery to an electrical appliance. The circumferential rim forms a sealing surface on which the sealing ring can be placed. Since, with the exception of the insertion opening, the contact housing does not have any other opening accessible from the outside and abuts directly on the step, via which the base side of the recess continues into the outer side of the rear wall of the battery housing, the contact assembly is, therefore, very well protected against mechanical impairment, and by connecting the battery to an electrical appliance with a sealing ring inserted between these, optimum protection of the contact assembly against splash water can be achieved in a simple manner.

The contact housing is preferably of parallelepipedal configuration and has a bottom wall resting with surface-to-surface contact on the base side of the recess, a cover wall arranged parallel to the bottom wall and in the plane of the outer side of the rear wall of the battery housing, and side walls which are aligned vertically to the rear wall, and each of which faces a narrow side of the recess.

The contact housing is preferably integrally connected to the battery housing, but constitutes a self-contained assembly, independently of the recess of the rear wall of the battery housing. In particular, the bottom wall of the contact housing is not formed by the base side of the recess, but rather a separate bottom wall of the contact housing is used. The circumferential rim, which surrounds the insertion opening of the contact housing in circumferential direction, is formed, in such a configuration, by the free end edges of the aforementioned contact housing walls, which face the end wall of the battery housing. When fitting the battery on an electrical appliance, a sealing ring can be placed on the circumferential rim.

The contact assembly can comprise a number of contact elements which are, for example, in the form of contact springs or contact pins. It is advantageous for the contact housing to have a partition wall, which is aligned vertically to the bottom wall, extends from the step to the insertion opening and divides the interior of the contact housing into a first and a second contact space. Different contact elements of the contact assembly can be mechanically and electrically separated from one another in a simple manner by means of the partition wall.

Provision can be made for the contact assembly to comprise four contact elements, a single contact element being positioned in the first contact space, and three contact elements arranged next to one another in a row being positioned in the second contact space. An electrical connection between the contact element arranged in the first contact space and the contact elements arranged in the second contact space is reliably prevented by the partition wall.

The contact element arranged in the first contact space preferably forms a first voltage connection, in particular, the positive pole, of the battery, and the contact element arranged in the middle of the row of three contact elements arranged in the second contact space preferably forms a second voltage connection, in particular, the negative pole, of the battery. The two voltage connections are, therefore, separated from each other by the partition wall, and within the second contact space the contact element forming a voltage connection of the battery is surrounded by two further contact elements.

Provision can be made for the contact elements arranged alongside the second voltage connection, for example, the negative pole, to be configured as sensors. By means of the sensors, measurement signals can be picked up from the battery and provided to the charger or the electrical appliance. For example, the charging state of the battery can be tested by a sensor and delivered to a display device of the electrical appliance or the charger.

In an advantageous embodiment, the contact element of the second contact space, which is arranged immediately next to the partition wall, is configured as temperature sensor. The temperature prevailing within the battery housing can be picked up by the temperature sensor.

The contact element of the second contact space, which is spaced maximally from the partition wall, is preferably configured as resistance sensor. By means of the resistance sensor, a resistance of the battery corresponding to the rated voltage of the battery can be picked up by, for example, the charger. The picked-up resistance value can be compared by the charger with a resistance value stored in a table, which corresponds to a certain rated voltage of the battery. It can, therefore, be ascertained in a simple manner whether the battery is providing a rated voltage of, for example, 12 V or 24 V.

In an advantageous embodiment of the invention, to establish a releasable connection between the battery and the electrical appliance or the charger, a connecting member is arranged at each of the narrow sides of the recess. In particular, a vacuum cleaner, a high-pressure cleaner or a sweeper driven by an electric motor can be used as electrical appliance. It is advantageous for the connecting member to extend only within the recess, and not to protrude outwards beyond the outer side of the rear wall of the battery housing. Therefore, as well as the contact housing arranged in the recess, the connecting members are also protected against mechanical impairment, should the rechargeable battery inadvertently fall on the ground. The risk of damage to the connecting members is, therefore, kept low.

The connecting members are preferably configured as guide ribs facing each other, which are arranged in spaced relation to the base side of the recess and extend as far as the level of the outer side of the rear wall of the battery housing.

It is particularly advantageous for the guide ribs together with the outer side of the rear wall of the battery housing and the cover wall of the contact housing to define an abutment plane for abutment of the battery on a supporting surface of the electrical appliance. The abutment plane enables a surface-to-surface abutment of the battery on the supporting surface and, as a result, a particularly stable holding of the battery. The power tool can comprise a connector corresponding to the recess of the rear wall and to the contact housing and having connection elements which are introducible via the insertion opening into the contact housing of the battery. The connection elements are preferably configured as plug-in sockets, which receive the contact elements of the contact assembly in the form of contact springs or contact pins. The connector of the electrical appliance can have an abutment surface which corresponds to the circumferential rim of the contact housing and forms a sealing surface for a sealing ring positionable between the abutment surface and the circumferential rim. Therefore, as well as the contact elements of the battery, the connection elements of the electrical appliance can be protected in a simple manner against splash water.

The following description of a preferred embodiment of the invention serves for further explanation in conjunction with the drawings.

DETAILED DESCRIPTION OF THE INVENTION

Figure 1:
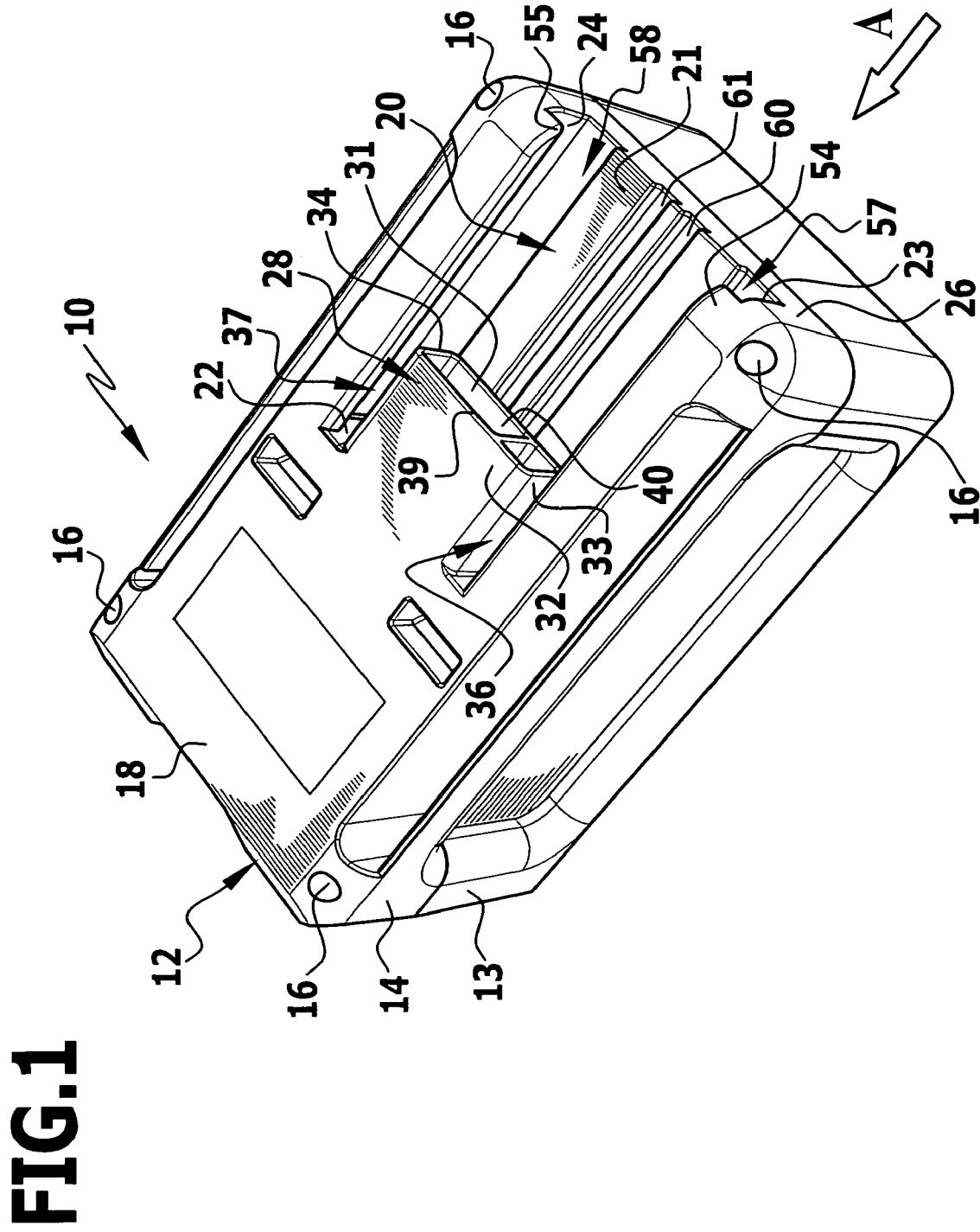
FIG. 1 shows a perspective representation of a rechargeable battery according to the invention.
Figure 2:
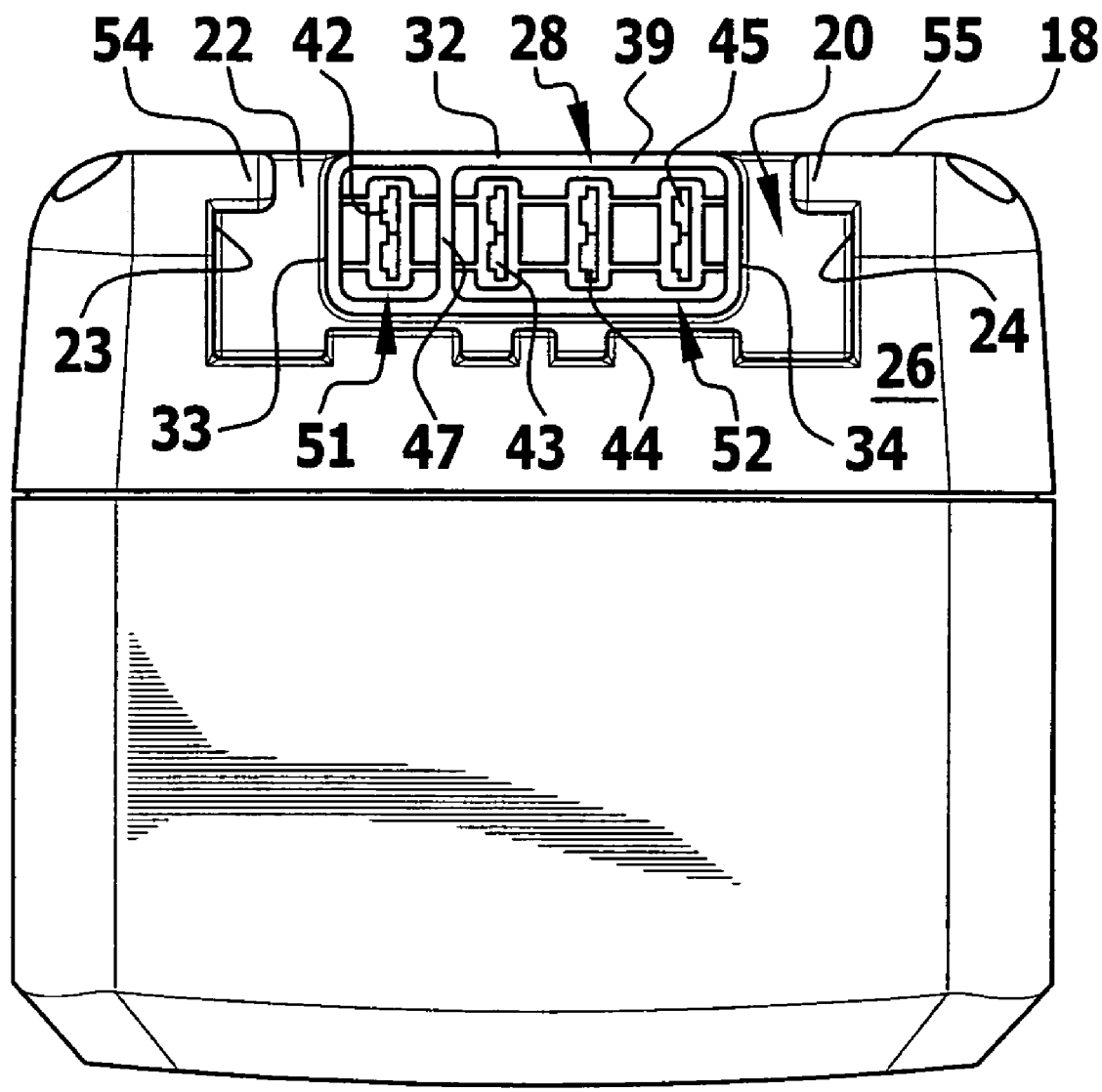
FIG. 2 shows a side view in the direction of arrow A from FIG. 1.

There is shown schematically in the drawings a rechargeable battery 10 according to the invention, which is of parallelepipedal configuration and has a battery housing 12 with a tub-shaped housing lower part 13 and a cover-shaped housing upper part 14 placed on the housing lower part 13 and screwed to the housing lower part with connecting screws 16. The battery housing accommodates a multiplicity of cells, known per se, and, therefore, not represented in the drawings, and it can be electrically and mechanically connected to an electrical appliance to supply the latter with power. For example, nickel-cadmium battery cells or nickel-metal-hydride battery cells or lithium-ion cells are used as cells. Since the battery is releasably connectable to the electrical appliance, it can be separated from the electrical appliance for charging and charged in a charger. One skilled in the art is familiar with such chargers.

The top side of the housing upper part 14 forms a rear wall 18 of the battery housing 12, with the outer side of which the battery 10 can be placed with surface-to-surface contact on a supporting wall of an electrical appliance when connecting it to the electrical appliance. There is formed in the rear wall 18 a recess 20 with a base side 21, which continues via a step 22 into the rear wall 18, and with two narrow sides 23, 24 facing each other. The recess 20 extends from the step 22 to an end wall 26 of the battery housing 12, so that a connector of the electrical appliance can be inserted into the recess 20 from the end wall 26. There rests against the step 22 a contact housing 28, which is integrally connected to the housing upper part 14 and has a bottom wall 31 resting with surface-to-surface contact on the base side 21 of the recess 20, a cover wall 32 extending parallel to the bottom wall 31, and side walls 33 and 34 joining the bottom wall 31 to the cover wall 32. The cover wall 32 extends in the plane of the rear wall 18, and the side walls 33, 34 are aligned vertically to the rear wall 18. An insertion channel 36 and 37, respectively, extends between the side wall 33 and 34, respectively, and the respectively adjacent narrow side 23 and 24, respectively, as far as the step 22.

The free end edges of the bottom wall 31, the cover wall 32 and the side walls 33 and 34, which face away from the step 22, form a circumferential rim 39, which completely surrounds in circumferential direction an insertion opening 40 of the contact housing 28, which faces away from the step 22. The rim 39 forms a sealing surface, on which a sealing ring can be placed when connecting the battery to an electrical appliance.

The contact housing 28 accommodates a contact assembly in the form of a total of four contact elements 42, 43, 44, 45, configured as contact springs, which are completely surrounded in circumferential direction by the contact housing 28. Between a first contact element 42 and the three further contact elements 43, 44, 45 there extends between the bottom wall 31 and the cover wall 32 of the contact housing 28 a partition wall 47, which divides the interior of the contact housing 28 into a first contact space 51 and a second contact space 52. The first contact space 51 accommodates the contact element 42 only, which forms a first voltage connection, preferably the positive pole, of the battery 10.

The second contact space 52 accommodates the contact elements 43, 44 and 45, which are arranged next to one another in a row. The contact element 44 arranged in the middle of this row forms the second voltage connection of the battery, preferably its negative pole, whereas the contact elements 43 and 45 arranged on either side of the contact element 44 each form a sensor. The contact element 43 arranged immediately next to the partition wall 47 is configured as temperature sensor, by means of which the temperature prevailing in the battery 10 can be picked up. The contact element 45 arranged at the side of the contact element 44 facing away from the partition wall 47 is configured as resistance sensor, by means of which a resistance of the battery 10 can be picked up, which corresponds to the rated voltage of the battery. By comparing the picked-up resistance value with resistance values, which are stored in a table, and with each of which a certain voltage value for the rated voltage of the battery is associated, the rated voltage of the battery can be determined in a simple manner, for example, by a charger. For example, the rated voltage can be 12 V, 24 V or also 36 V.

Arranged at each of the narrow sides 23, 24 of the recess 20 facing each other is a connecting member in the form of a protruding guide rib 54 and 55, respectively, which extends over the entire length of the narrow sides 23, 24. The guide ribs 54, 55 face each other and are arranged in spaced relation to the base side 21, so that a guide groove 57 and 58, respectively, extends between each of the guide ribs 54 and 55, respectively, and the base side 21 of the recess 20.

The guide ribs 54, 55 extend as far as the level of the outer side of the rear wall 18 and the cover wall 32 and form jointly with these walls a flat abutment surface for abutment of the battery 10 on a corresponding supporting surface of the electrical appliance to which the battery 10 is releasably connectable.

In the embodiment shown, two coding grooves 60, 61 aligned parallel to each other are formed in the base side 21 and extend from the circumferential rim 39 of the contact housing 28 to the end wall 26 of the battery housing 12.

To establish an electrical and mechanical connection of the battery 10 to an electrical appliance, a connector of the electrical appliance can be introduced from the end wall 26 into the recess 20. In doing so, guide rails of the connector engage the guide grooves 57 and 58, and connection elements of the electrical appliance, for example, connection sockets, can be introduced via the insertion opening 40 into the first contact space 51 and the second contact space 52 of the contact housing 28. Before the corresponding connection elements are introduced into the interior of the contact housing 28, there can be placed on the circumferential rim 39 a sealing ring, which can be placed, on the one hand, on the circumferential rim 39 forming a sealing surface and, on the other hand, on a corresponding rim of the connector of the electrical appliance, so that the contact elements 42, 43, 44 and 45 and the corresponding connection elements of the electrical appliance are reliably protected against splash water.

The invention claimed is:

1. Rechargeable battery, comprising:
    a battery housing having a rear wall with a recess which extends as far as an end wall of the battery housing, the recess having a base side and narrow sides facing each other, the base side continuing via a step into an outer side of the rear wall,
    a cover extending from the step being positioned at the step, and
    a contact assembly which is covered by the cover, the contact assembly comprising four contact elements, a single contact element being positioned in a first contact space, and three contact elements arranged next to one another in a row being positioned in a second contact space,
    wherein:
        the cover forms a contact housing which completely surrounds the contact assembly in a circumferential direction,
        the cover has an insertion opening on a side facing away from the step,
        the contact housing is of parallelepipedal configuration and has a bottom wall resting with surface-to-surface contact on the base side of the recess, a cover wall arranged parallel to the bottom wall and in a plane of the outer side of the rear wall of the battery housing, side walls which are aligned vertically to the rear wall, each of which faces a narrow side of the recess, and a partition wall, which is aligned vertically to the bottom wall and extends from the step to the insertion opening and divides the interior of the contact housing into the first and the second contact space,
        the insertion opening is surrounded by a circumferential rim of the contact housing, and
        the circumferential rim forms a sealing surface, and
        the contact element arranged in the first contact space forms a first voltage connection of the battery, and the contact element arranged in the middle of the row of three contact elements of the second contact space forms a second voltage connection of the battery.

2. Rechargeable battery in accordance with claim 1, wherein the contact elements arranged alongside the second voltage connection are configured as sensors.

3. Rechargeable battery, comprising:
    a battery housing having a rear wall with a recess which extends as far as an end wall of the battery housing, the recess having a base side and narrow sides facing each other, the base side continuing via a step into an outer side of the rear wall,
    a cover extending from the step being positioned at the step, and
    a contact assembly which is covered by the cover, the contact assembly comprising four contact elements, a single contact element being positioned in a first contact space, and three contact elements arranged next to one another in a row being positioned in a second contact space,
    wherein:
        the cover forms a contact housing which completely surrounds the contact assembly in a circumferential direction,
        the cover has an insertion opening on a side facing away from the step,
        the contact housing is of parallelepipedal configuration and has a bottom wall resting with surface-to-surface contact on the base side of the recess, a cover wall arranged parallel to the bottom wall and in a plane of the outer side of the rear wall of the battery housing, side walls which are aligned vertically to the rear wall, each of which faces a narrow side of the recess, and a partition wall, which is aligned vertically to the bottom wall and extends from the step to the insertion opening and divides the interior of the contact housing into the first and the second contact space,
        the insertion opening is surrounded by a circumferential rim of the contact housing,
        the circumferential rim forms a sealing surface, and
        the contact element of the second contact space that is arranged immediately next to the partition wall is configured as a temperature sensor.

4. Rechargeable battery, comprising:
    a battery housing having a rear wall with a recess which extends as far as an end wall of the battery housing, the recess having a base side and narrow sides facing each other, the base side continuing via a step into an outer side of the rear wall,
    a cover extending from the step being positioned at the step, and
    a contact assembly which is covered by the cover, the contact assembly comprising four contact elements, a single contact element being positioned in a first contact space, and three contact elements arranged next to one another in a row being positioned in a second contact space, wherein:

the cover forms a contact housing which completely surrounds the contact assembly in a circumferential direction, the cover has an insertion opening on a side facing away from the step, the contact housing is of parallelepipedal configuration and has a bottom wall resting with surface-to-surface contact on the base side of the recess, a cover wall arranged parallel to the bottom wall and in a plane of the outer side of the rear wall of the battery housing, side walls which are aligned vertically to the rear wall, each of which faces a narrow side of the recess, and a partition wall, which is aligned vertically to the bottom wall and extends from the step to the insertion opening and divides the interior of the contact housing into the first and the second contact space, the insertion opening is surrounded by a circumferential rim of the contact housing, the circumferential rim forms a sealing surface, and the contact element of the second contact space that is spaced maximally from the partition wall is configured as a resistance sensor.

5. Rechargeable battery in accordance with claim 1, wherein a connecting member is arranged at each of the narrow sides of the recess for releasably connecting the battery to an electrical appliance.

6. Rechargeable battery in accordance with claim 5, wherein:

the connecting members are configured as guide ribs facing each other, the guide ribs are arranged in spaced relation to the base side of the recess and extend as far as a level of the outer side of the rear wall of the battery housing.

7. Rechargeable battery in accordance with claim 6, wherein the guide ribs together with the outer side of the rear wall of the battery housing and the cover wall of the contact housing define an abutment plane for abutment of the battery on a supporting surface of an electrical appliance.

8. Rechargeable battery in accordance with claim 5, wherein the electrical appliance comprises one of a vacuum cleaner, a high-pressure cleaner or a sweeper driven by an electric motor.

* * * * *